United States Patent
Shiobara et al.

(10) Patent No.: US 11,920,011 B2
(45) Date of Patent: Mar. 5, 2024

(54) RESIN SUBSTRATE HAVING DIELECTRIC CHARACTERISTICS WITH LITTLE FREQUENCY DEPENDENCE

(71) Applicant: SHIN-ETSU CHEMICAL CO., LTD., Tokyo (JP)

(72) Inventors: Toshio Shiobara, Annaka (JP); Yusuke Taguchi, Takasaki (JP); Ryunosuke Nomura, Takasaki (JP); Hajime Itokawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/580,262

(22) Filed: Jan. 20, 2022

(65) Prior Publication Data
US 2022/0275158 A1 Sep. 1, 2022

(30) Foreign Application Priority Data
Feb. 26, 2021 (JP) .................................. 2021-029813

(51) Int. Cl.
*C08J 5/24* (2006.01)

(52) U.S. Cl.
CPC .............. *C08J 5/244* (2021.05); *C08J 5/249* (2021.05); *C08J 2379/08* (2013.01)

(58) Field of Classification Search
CPC ..... C08J 5/244; C08J 5/24; C08J 5/249; C08J 5/08; C08J 5/043; C08J 2379/08; C08K 7/14; C08L 27/12; H05K 1/03; H05K 1/0313
USPC ......... 442/117; 428/220, 297.4, 299.4, 292.1
See application file for complete search history.

(56) References Cited

U.S. PATENT DOCUMENTS

| | | | |
|---|---|---|---|
| 5,202,104 A | 4/1993 | Watanabe et al. | |
| 2009/0266591 A1* | 10/2009 | Amou | ...................... C08J 5/249 174/258 |

FOREIGN PATENT DOCUMENTS

| | | |
|---|---|---|
| JP | H02-289416 A | 11/1990 |
| JP | H05-170483 A | 7/1993 |
| JP | 2005-089691 A | 4/2005 |
| JP | 2019-194285 A | 11/2019 |

OTHER PUBLICATIONS

Asano, Hitoshi "Change in OH Group Concentration in Silica Glass Accompanying Heat Treatment" Master's Program, University of Fukui, Graduate School of Engineering, University Department of Applies Physics, Department of Molecular Science 08780013, Feb. 2011.

Fujii, Kenji "Structural Change in Silica Glass Block Due to Heat Treatment" Master's Program, Graduate School of Engineering, University of Fukui Department of Applied Physics, Department of Molecular Science 03780161.

Dec. 19, 2023 Office Action issued in Japanese Patent Application No. 2021-029813.

\* cited by examiner

*Primary Examiner* — Camie S Thompson
(74) *Attorney, Agent, or Firm* — Oliff PLC

(57) ABSTRACT

The present invention is a resin substrate including an organic resin and a quartz glass cloth, where the organic resin has a dielectric loss tangent of 0.0002 to 0.0020 measured at 10 GHz and a 40 GHz/10 GHz ratio is 0.4 to 0.9, the quartz glass cloth has a dielectric loss tangent of 0.0001 to 0.0015 measured at 10 GHz and a 40 GHz/10 GHz ratio is 1.2 to 2.0, and the resin substrate has a dielectric loss tangent of 0.0001 to 0.0020 at 10 GHz and a 40 GHz/10 GHz ratio is 0.8 to 1.2. This provides a resin substrate having a low dielectric loss tangent in a high-frequency region and dielectric characteristics with little frequency dependence.

11 Claims, No Drawings

RESIN SUBSTRATE HAVING DIELECTRIC CHARACTERISTICS WITH LITTLE FREQUENCY DEPENDENCE

TECHNICAL FIELD

The present invention relates to a resin substrate having dielectric characteristics with little frequency dependence.

BACKGROUND ART

With the development of high-speed communication, such as 5G, substrates for high-speed communication and antenna substrates have been strongly desired, the substrates having little transmission loss even when using a high frequency such as a millimeter wave. In addition, in information terminals such as smartphones, circuit boards have come to have high density mounting and to be extremely thin with remarkable progress.

In high-speed substrates of over 10 GHz, it has become difficult to ensure signal quality by an extension of conventional techniques.

A laminated plate for such a high-speed communication such as 5G is widely used today. The laminated plate is achieved by laminating prepregs and curing under heat and pressure. The prepregs are obtained by impregnating a low dielectric glass cloth, such as D glass, NE glass, and L glass, with a resin that includes a thermoplastic resin such as fluorine resin or polyphenylene ether, and further includes a low dielectric epoxy resin, a low dielectric maleimide resin, or the like. However, regarding glass cloths with improved dielectric characteristics such as D glass, NE glass, and L glass, each glass has a large dielectric loss tangent of about 0.002 to 0.005 in a high-frequency region of 10 G or higher. In addition, frequency dependence is also large, so that it is difficult to apply such glass cloths to a wide variety of uses as high-speed millimeter-wave substrates.

Note that it is known that a material having a smaller dielectric constant ($\varepsilon$) and dielectric loss tangent (tan $\delta$) has a more improved transmission loss of a signal, as shown by the Edward A. Wolff formula:

$$\text{transmission loss} \sim \text{(is proportional to)} \sqrt{\varepsilon} \times \tan \delta.$$

In order to achieve a low dielectric loss tangent in an organic resin substrate such as a printed circuit board, a common method is to use an inorganic powder or a glass cloth each having a lower dielectric loss tangent than the resin. However, in such a substrate, the dielectric characteristics of the resin to be a binder are different from the dielectric characteristics of the inorganic powder or glass cloth when seen on a microscopic scale, so that it is not possible to obtain a low dielectric substrate having uniform dielectric characteristics even when high-frequency waves such as millimeter waves are used. In particular, hardly any substrates having uniform dielectric characteristics of a dielectric loss tangent of less than 0.0015 and a dielectric constant of 4.0 or less are known in a wide high-frequency region, for example, 1 GHz to 50 GHz.

Silica powder is a typical inorganic material having low dielectric characteristics, and quartz glass cloth is also. Silica powder is used as an inorganic powder for adding in resin, and quartz glass cloth is used as reinforcement for substrates. These have a small expansion coefficient, and are also materials excellent in insulation and dielectric characteristics. Generally, quartz glass cloth and silica powder are known to have extremely excellent dielectric characteristics. However, the dielectric loss tangent of currently available quartz glass cloth and silica powder cannot be adjusted at will.

It is generally known that an amount of hydroxy group (OH group) remaining in a quartz glass or silica powder varies depending on manufacturing method and heat treatment, and that the difference in OH concentration brings difference in various physical properties (Non Patent Document 1).

In Patent Document 1, a low-silanol silica powder is manufactured by a heat treatment. However, only the reduction rate of the number of the silanol groups (Si—OH groups) is mentioned, and the silanol amount of the heat-treated silica powder is not measured. Moreover, there is no mention of correlation with the dielectric loss tangent.

Patent Document 2 describes the relation between the water amount in a silica glass fiber and dielectric loss tangent. However, the document contains no mention of the silanol amount, and shows only the value of the dielectric loss tangent measured for a printed substrate including a glass fiber and PTFE. Therefore, the correlation between the silanol amount and the dielectric loss tangent of the glass fiber is unclear.

Reducing OH groups to a predetermined amount by a high-temperature treatment in order to improve dielectric loss tangent is not known. In addition, distortion is increased if a quartz glass or silica powder is heat-treated at a high temperature, and the distortion is increased particularly on the glass surface (Non Patent Document 2), so that strength is greatly degraded. Therefore, this has not been put to practical use.

CITATION LIST

Patent Literature

Patent Document 1: JP H2-289416 A
Patent Document 2: JP H5-170483 A

Non Patent Literature

Non Patent Document 1: Netsu shori ni tomonau shirika garasu chu no OH ki noudo henka (Change in OH Group Concentration in Silica Glass Accompanying Heat Treatment) February, 2011, University of Fukui, Graduate School of Engineering, Thesis for Master's Program Non Patent Document 2: Shirika garasu burokku no netsu shori niyoru kouzou henka (Structural Change in Silica Glass Block Due to Heat Treatment) February, 2005, University of Fukui, Graduate School of Engineering, Thesis for Master's Program

SUMMARY OF INVENTION

Technical Problem

In conventional technology, there is a problem that it is not possible to provide a substrate having a low dielectric loss tangent in a wide high-frequency region of 1 GHz to 50 GHz and uniform dielectric characteristics.

The present invention has been made to solve the problem, and an object thereof is to provide a resin substrate having a low dielectric loss tangent in a high-frequency region and dielectric characteristics with little frequency dependence.

Solution to Problem

To solve the above-described problem, the present invention provides a resin substrate comprising an organic resin and a quartz glass cloth, wherein
the organic resin has a dielectric loss tangent of 0.0002 to 0.0020 measured at 10 GHz and a ratio of a dielectric loss tangent at 40 GHz to a dielectric loss tangent at 10 GHz (40 GHz/10 GHz ratio) is 0.4 to 0.9,
the quartz glass cloth has a dielectric loss tangent of 0.0001 to 0.0015 measured at 10 GHz and a ratio of a dielectric loss tangent at 40 GHz to a dielectric loss tangent at 10 GHz (40 GHz/10 GHz ratio) is 1.2 to 2.0, and
the resin substrate has a dielectric loss tangent of 0.0001 to 0.0020 measured at 10 GHz and a ratio of a dielectric loss tangent at 40 GHz to a dielectric loss tangent at 10 GHz (40 GHz/10 GHz ratio) is 0.8 to 1.2.

Such a resin substrate of the present invention has a low dielectric loss tangent in a high-frequency region, and can exhibit dielectric characteristics with little frequency dependence.

In this case, a silica powder having a dielectric loss tangent of 0.0001 to 0.0015 at 10 GHz is preferably further comprised.

When such a silica powder is contained, it is possible to adjust the expansion coefficient, dielectric characteristics, and so forth of the substrate.

Furthermore, in the present invention, the organic resin can be one or more thermosetting resins selected from a group consisting of epoxy resin, allylated epoxy resin, maleimide resin, bismaleimide resin, cyanate resin, and cyclopentadiene-styrene copolymer resin.

Such a thermosetting resin can be used suitably in view of dielectric characteristics and strength of the resin substrate.

In this case, the thermosetting resin is preferably a bismaleimide resin shown by the following general formula, In this case, the thermoplastic resin is preferably fluorine resin.

Such a resin is preferably from the viewpoint of low dielectric characteristics.

Further preferably, the fluorine resin is one or more selected from a group consisting of polytetrafluoroethylene [PTFE], tetrafluoroethylene-hexafluoropropylene copolymer [FEP], and tetrafluoroethylene-perfluoroalkoxyethylene copolymer [PFA].

Such fluorine resin is desirable since the fluorine resin has a low dielectric loss tangent.

Advantageous Effects of Invention

As described above, the inventive resin substrate has a low dielectric loss tangent even in a high-frequency region and can exhibit dielectric characteristics with little frequency dependence. In particular, the inventive resin substrate makes it possible to send signals that are stable, have favorable quality, and have stable dielectric characteristics in a wide frequency band of 1 GHz to 50 GHz. Furthermore, the inventive resin substrate is also excellent in transmission properties of high-frequency signals.

Moreover, by using the inventive resin substrate, it is possible to fabricate an ideal substrate, having very little transmission loss in high-speed communication using millimeter waves or the like.

DESCRIPTION OF EMBODIMENTS

As described above, it has been desired to develop a resin substrate having a low dielectric loss tangent in a high-frequency region and dielectric characteristics with little frequency dependence.

To solve the problem, the present inventors have earnestly studied, and examined, in particular, how to achieve low

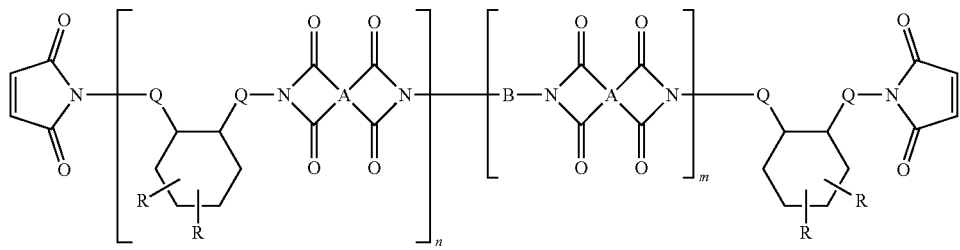

wherein A independently represents a tetravalent organic group including an aromatic ring or an aliphatic ring; B represents an alkylene chain having 6 to 18 carbon atoms and having an aliphatic ring optionally containing a divalent heteroatom; Q independently represents a linear alkylene group having 6 or more carbon atoms; R independently represents a linear or branched alkyl group having 6 or more carbon atoms; "n" represents a number of 1 to 10; and "m" represents a number of 0 to 10.

Such a bismaleimide resin is suitable for lowering the dielectricity of the substrate.

Alternatively, in the present invention, the organic resin can be one or more thermoplastic resins selected from a group consisting of polyphenylene ether, polyether ether ketone, polyether ketone, polyether sulfone, and fluorine resin.

Such a thermoplastic resin can also be used suitably in view of the dielectric characteristics of the resin substrate.

dielectricity without frequency dependence. As a result, the present inventors have found out that it is possible to produce a low dielectric resin substrate having extremely low frequency dependence by combining: an organic resin having a dielectric loss tangent that has frequency dependence with a negative correlation; and a quartz glass cloth or a silica powder with a positive correlation.

To adjust to the dielectric loss tangent of the organic resin having a dielectric loss tangent which has frequency dependence with a negative correlation, the amount of hydroxy group (silanol group) present in the quartz glass cloth or silica powder can be controlled. In this manner, the frequency dependence of the dielectric loss tangent of the quartz glass cloth, etc. can be easily adjusted to the target value.

To achieve a dielectric loss tangent having a positive correlation to frequency, the silica powder and quartz glass cloth can be heated at a temperature of 500° C. to 1,500° C.

Thus, the amount of hydroxy group in the quartz glass cloth and so forth can be controlled easily, and the dielectric loss tangent can be adjusted to any level. In addition, the present inventors have found out that slightly etching a surface of the silica powder or quartz glass cloth enables the surface thereof to become hard to improve the adhesion with resin, and further, in the quartz glass cloth, the tensile strength of the cloth is greatly improved.

The present inventors have also found out the following: the dielectric loss tangent of the quartz glass cloth and silica powder can be freely altered; this makes possible to adjust the dielectric loss tangent of the quartz glass cloth and silica powder according to the frequency dependence of the dielectric loss tangent of the low dielectric resin contained in a resin substrate, so that the resin substrate has very little variation in dielectric loss tangent characteristics depending on frequency; and it is possible to achieve the resin substrate that is suitable for a low dielectric substrate for high-speed millimeter-wave communication or the like. Thus, the present invention has been completed.

That is, the present invention is a resin substrate comprising an organic resin and a quartz glass cloth, wherein
the organic resin has a dielectric loss tangent of 0.0002 to 0.0020 measured at 10 GHz and a ratio of a dielectric loss tangent at 40 GHz to a dielectric loss tangent at 10 GHz (40 GHz/10 GHz ratio) is 0.4 to 0.9,
the quartz glass cloth has a dielectric loss tangent of 0.0001 to 0.0015 measured at 10 GHz and a ratio of a dielectric loss tangent at 40 GHz to a dielectric loss tangent at 10 GHz (40 GHz/10 GHz ratio) is 1.2 to 2.0, and
the resin substrate has a dielectric loss tangent of 0.0001 to 0.0020 measured at 10 GHz and a ratio of a dielectric loss tangent at 40 GHz to a dielectric loss tangent at 10 GHz (40 GHz/10 GHz ratio) is 0.8 to 1.2.

In this manner, the present inventors have made it possible to manufacture a resin substrate that is particularly suitable as a resin substrate for high-speed millimeter-wave communication, the resin substrate having stable dielectric characteristics in a wide frequency band of 1 GHz to 50 GHz. This has been achieved by preparing and combining: an organic resin to be a matrix of the resin substrate, the organic resin having a dielectric loss tangent which has a negative correlation to frequency; and a quartz glass cloth, silica powder, and the like having a dielectric loss tangent which has, on the other hand, a positive correlation to frequency.

Hereinafter, the present invention will be described in detail, but the present invention is not limited thereto.

The present invention relates to a resin substrate including a quartz glass cloth, a silica powder contained as necessary, and an organic resin having low dielectric characteristics (low dielectric resin), and the resin substrate that is suitable for a low dielectric substrate for high-speed millimeter-wave communication and so forth, having a dielectric loss tangent with very little frequency dependence in a millimeter-wave region.

If the dielectric characteristics, in particular, dielectric loss tangent of existing silica powder and quartz glass cloth can be adjusted at will, silica powder and quartz glass cloth can be developed for a wide variety of uses. This includes use as encapsulants for semiconductors for high-speed communication and the like, and as reinforcement or fillers for substrates for high-speed communication, antenna substrates, and the like. These are expected to be greatly developed hereafter. Accordingly, the present inventors have found out a means to adjust the dielectric characteristics of raw materials (quartz glass cloth and silica powder) freely as described below, and applied the means to the following present invention.

[Resin Substrate]

The present invention is a resin substrate including an organic resin and a quartz glass cloth, where
the organic resin has a dielectric loss tangent of 0.0002 to 0.0020 measured at 10 GHz and a ratio of a dielectric loss tangent at 40 GHz to a dielectric loss tangent at 10 GHz (40 GHz/10 GHz ratio) is 0.4 to 0.9,
the quartz glass cloth has a dielectric loss tangent of 0.0001 to 0.0015 measured at 10 GHz and a ratio of a dielectric loss tangent at 40 GHz to a dielectric loss tangent at 10 GHz (40 GHz/10 GHz ratio) is 1.2 to 2.0, and
the resin substrate has a dielectric loss tangent of 0.0001 to 0.0020 at 10 GHz and a ratio of a dielectric loss tangent at 40 GHz to a dielectric loss tangent at 10 GHz (40 GHz/10 GHz ratio) is 0.8 to 1.2.

Here, the ratio of the dielectric loss tangent at 40 GHz to the dielectric loss tangent at 10 GHz (40 GHz/10 GHz ratio) is an index that indicates the frequency dependence of the dielectric loss tangent. When the ratio is less than 1, it indicates that the higher the frequency, the smaller the dielectric loss tangent (that is, a negative correlation). On the other hand, when the ratio is greater than 1, it indicates that the higher the frequency, the greater the dielectric loss tangent (that is, a positive correlation).

In the present invention, the 40 GHz/10 GHz ratio of the organic resin is 0.4 to 0.9, preferably 0.45 to 0.90. The 40 GHz/10 GHz ratio of the quartz glass cloth is 1.2 to 2.0, preferably 1.3 to 1.9. The 40 GHz/10 GHz ratio of the resin substrate is 0.8 to 1.2, preferably 0.85 to 1.20. If any of the above components has a 40 GHz/10 GHz ratio outside the essential range, frequency dependence in a high-frequency region becomes too large, and stable signals of excellent quality cannot be sent.

In such a resin substrate, an organic resin between wirings, having a dielectric loss tangent with frequency dependence having a negative correlation, that is, the higher the frequency, the smaller the dielectric loss tangent of the organic resin, and a raw material having, on the other hand, a dielectric loss tangent that has a positive correlation to frequency, that is, the dielectric loss tangent becomes greater, are adjusted and combined. In this way, a resin substrate having dielectric characteristics with little frequency dependence can be obtained even when the substrate has an uneven distribution of the resin or glass cloth above and below the wirings, and it is possible to send stable signals having excellent quality and no variation in propagation time.

Moreover, by combining an organic resin whose dielectric loss tangent has frequency dependence having a negative correlation and a quartz glass cloth and silica powder having the dielectric loss tangent freely adjusted to give a dielectric loss tangent with frequency dependence having a positive correlation, it is possible to achieve a resin substrate that has dielectric characteristics with little frequency dependence and that is suitable for a low dielectric substrate for high-speed millimeter-wave communication or the like with no transmission loss, greatly expected to be developed hereafter.

Hereinafter, members (components) constituting the inventive resin substrate will be described.

[Quartz Glass Cloth]

As the material of the quartz glass cloth to be used in the present invention, a naturally produced quartz with little impurity or a synthetic quartz made from raw materials of silicon tetrachloride or the like, can be mainly used.

The impurity concentration in the quartz glass material is more preferably as follows: a sum total of alkali metal such as Na, K, and Li, of 10 ppm or less; 1 ppm or less of B; 1 ppm or less of P; and to prevent malfunction due to radiation, U and Th contents of 0.1 ppb or less each. The concentrations of the above impurities can be measured by atomic absorption spectrophotometry.

The quartz glass cloth of the present invention can be manufactured by producing a filament or yarn from a quartz ingot obtained in the following manner as the raw material and weaving.

A quartz ingot can be manufactured by an electric melting method or a flame-fusion method with naturally produced quartz as a raw material; a direct synthesis method, a plasma synthesis method, or a soot method with silicon tetrachloride as a raw material; a sol-gel method with alkyl silicate as a raw material; or the like.

For example, a quartz yarn with a diameter of 100 to 300 μm to be used in the present invention can be manufactured by melting an ingot at 1,700 to 2,300° C., extending, and winding.

Note that in the present description, the thin thread-like filament obtained by extending a quartz yarn as described above is defined as a quartz glass filament, bundled quartz glass filaments as a quartz glass strand, and bundled and further twisted quartz glass filaments as a quartz glass yarn.

In the case of a quartz glass filament, the diameter thereof is preferably 3 μm to 20 μm, more preferably 3.5 μm to 9 μm. Methods for manufacturing a quartz glass filament include the above-described extending methods and the like by electric melting and oxyhydrogen flame using quartz yarn. However, the manufacturing methods are not limited thereto as long as the quartz glass filament diameter is 3 μm to 20 μm.

A quartz glass strand is preferably manufactured by bundling 10 to 400 of the quartz glass filaments, more preferably 40 to 200.

Furthermore, the quartz glass cloth to be used in the present invention can be manufactured by weaving the above-described quartz glass yarn or strand. There is no particular restriction to the method for weaving a quartz glass cloth, and examples include weaving by a rapier loom, a shuttle loom, and an air jet loom.

[Low Dielectric Quartz Glass Cloth]

The quartz glass cloth used in the present invention has a dielectric loss tangent of 0.0001 to 0.0015 measured at 10 GHz and a ratio of a dielectric loss tangent at 40 GHz to a dielectric loss tangent at 10 GHz (40 GHz/10 GHz ratio) is 1.2 to 2.0, but other characteristics are not particularly limited. However, it is preferable to use a low dielectric quartz glass cloth on the basis of the following knowledge.

The present inventors have found out that it is possible to adjust the value of the dielectric loss, tangent at 1 GHz to 50 GHz and the frequency dependence of the dielectric loss tangent at will by using a low dielectric quartz glass cloth obtained as follows: a quartz glass cloth having a dielectric loss tangent of less than 0.0015 and a dielectric constant of 3.2 to 3.9 in a high-frequency region at 10 GHz and tensile strength of 2.7 N/25 mm or more per cloth weight (g/m$^2$) is subjected to a high-temperature treatment at a temperature of 500° C. or higher; and then, a strained layer on the surface of the fibers configuring the cloth is removed.

In the present invention, preferably, the above-described quartz glass cloth is heat-treated at a high temperature to freely adjust the hydroxy groups present in the quartz, then the strained layer generated on the quartz glass surface is dissolved and removed, and the resultant quartz glass surface is treated with a coupling agent or the like to give a low dielectric quartz glass cloth, and this low dielectric quartz glass cloth is used.

When removing the hydroxy groups in the quartz, the heating temperature can be 500° C. to 1,500° C., and the heating time can be 10 minutes to 24 hours. Note that the cooling to room temperature after heating can be either slow or rapid. However, depending on conditions, the heating temperature and cooling conditions are preferably optimized since quartz glass in a molten state sometimes partially crystalizes. The heating atmosphere is not particularly limited, and can be in the air or in an inert gas such as nitrogen under normal or reduced pressure, or in a vacuum. However, heating is usually performed in the air considering cost, etc. The degree of decrease in the hydroxy groups attributable to the heat treatment can be analyzed by infrared spectroscopic analysis or the like to observe whether the desired dielectric characteristics have been reached.

By adjusting the heating temperature and the heating time in this step, the dielectric loss tangent at 10 GHz can be freely controlled within a range of 0.0001 to 0.0015, which is the intrinsic level of quartz, without the dielectric constant fluctuating. To achieve a low dielectric substrate, the dielectric loss tangent can be 0.0001 to 0.0010, more preferably 0.0001 to 0.0008, and further preferably 0.0001 to 0.0005.

Even after the treatment, the dielectric constant of the quartz glass cloth does not change from before the treatment, and exhibits excellent characteristics of 3.2 to 3.9.

Note that the dielectric characteristics (dielectric loss tangent and dielectric constant) of the quartz glass cloth can be measured at a predetermined frequency by connecting a network analyzer and an SPDR (Split post dielectric resonator).

When a quartz glass cloth is heat-treated at a temperature of 500° C. or higher, strength is sometimes degraded. It is considered that this is caused in the following manner: a slight strain remains in the surface layer of the quartz glass cloth after the heat treatment at a high temperature, and the quartz glass cloth easily breaks from this strain. Accordingly, as a quartz glass cloth to be used in the present invention, it is preferable to use a low dielectric quartz glass cloth with the strained layer removed and the strength recovered.

The strained layer of the quartz glass cloth can be removed easily by immersing the cloth in an etching solution or the like.

When manufacturing a prepreg, a surface treatment can be performed with a silane coupling agent in order to strengthen the adhesion between the resin and the quartz glass cloth surface. In the surface treatment, after the quartz glass cloth is treated at a high temperature and etched, the etched quartz glass cloth is cleaned, and then the surface of the quartz glass cloth is coated with a silane coupling agent.

As the silane coupling agent, a known silane coupling agent can be used, and alkoxysilane is preferable. As typical silane coupling agents, one or more types selected from the group consisting of the following are preferable: amino-based silane coupling agents such as 3-aminopropyltrimethoxysilane (manufactured by Shin-Etsu Chemical Co., Ltd., product name: KBM-903), 3-aminopropyltriethoxysilane (manufactured by Shin-Etsu Chemical Co., Ltd., product name: KBE-903), N-2-(aminoethyl)-3-aminopropyltrimethoxysilane (manufactured by Shin-Etsu Chemical Co., Ltd., product name: KBM-603), and N-2-(aminoethyl)-3-aminopropyltriethoxysilane (manufactured by Shin-Etsu Chemical Co., Ltd., product name: KBE-903); unsaturated group-containing silane coupling agents such as vinyltrimethoxysilane (manufactured by Shin-Etsu Chemical Co., Ltd., product name: KBM-1003), vinyltriethoxysilane (manufactured by Shin-Etsu Chemical Co., Ltd., product name: KBE-1003), 3-methacryloxypropyltrimethoxysilane (manufactured by Shin-Etsu Chemical Co., Ltd., product name: KBM-503), 3-methacryloxypropyltriethoxysilane (manufactured by Shin-Etsu Chemical Co., Ltd., product name: KBE-503), and p-styryltrimethoxysilane (manufactured by Shin-Etsu Chemical Co., Ltd., product name: KBM-1403); fluorine-atom-containing silane coupling agents such as trifluoropropyl trimethoxysilane (manufactured by Shin-Etsu Chemical Co., Ltd., product name: KBM-7103), and perfluoropolyether-containing trialkoxysilane (manufactured by Shin-Etsu Chemical Co., Ltd., product name: X-71-195, KY-1901, KY-108); silane coupling agents containing functional groups or organic groups other than those described above such as glycidoxypropyltrimethoxysilane (manufactured by Shin-Etsu Chemical Co., Ltd., product name: KBM-403), glycidoxypropyltriethoxysilane (manufactured by Shin-Etsu Chemical Co., Ltd., product name: KBE-403), 3-mercaptopropyltrimethoxysilane (manufactured by Shin-Etsu Chemical Co., Ltd., product name: KBM-803), 3-isocyanatepropyltriethoxysilane (manufactured by Shin-Etsu Chemical Co., Ltd., product name: KBE-9007), and 3-trimethoxysilylpropyl succinic anhydride (manufactured by Shin-Etsu Chemical Co., Ltd., product name: X-12-967C); oligomers including the amino-based silane coupling agents and the unsaturated group-containing silane coupling agents; and the like. In particular, the amino-based silane coupling agents and the unsaturated group-containing silane coupling agents are more preferable.

The silane coupling agent is usually used as a diluted aqueous solution at a concentration of 0.1 mass % to 5 mass %, but it is particularly effective to use at 0.1 mass % to 1 mass %. By using such a quartz glass cloth, the silane coupling agent adheres uniformly, and brings a more uniform protection effect to the quartz glass cloth surface so that handling becomes easy. Moreover, uniform application without unevenness to resin that is used when fabricating prepreg becomes possible.

[Organic Resin]

The organic resin contained in the inventive resin substrate has a dielectric loss tangent of 0.0002 to 0.0020 measured at 10 GHz and a ratio of a dielectric loss tangent at 40 GHz to a dielectric loss tangent at 10 GHz (40 GHz/10 GHz ratio) is 0.4 to 0.9, and other characteristics are not particularly limited.

As an organic resin contained in a resin substrate such as a low dielectric substrate for high-speed millimeter-wave communication, any thermosetting or thermoplastic organic resin having low dielectric characteristics, having a dielectric constant of 2.0 to 3.5 and a dielectric loss tangent of 0.002 or less, preferably 0.0018 or less at 10 GHz may be used. In addition, the resins may be mixed and used in combination.

Typical examples of the thermoplastic resin include polyphenylene ether, polyether ether ketone, polyether ketone, polyether sulfone, and fluorine resin. In particular, fluorine resin is preferable because of low dielectric characteristics. As the fluorine resin, at least one selected from the group consisting of the following is preferable: polytetrafluoroethylene [PTFE], tetrafluoroethylene-ethylene copolymer [ETFE], tetrafluoroethylene-hexafluoropropylene copolymer [FEP], tetrafluoroethylene-perfluoroalkoxyethylene copolymer [PFA], polychlorotrifluoroethylene [PCTFE], chlorotrifluoroethylene-ethylene copolymer [ECTFE], chlorotrifluoroethylene-tetrafluoroethylene copolymer, polyvinylidene fluoride [PVdF], and a thermoplastic fluorine resin containing three types of monomers, tetrafluoroethylene, hexafluoropropylene, and vinylidene fluoride [THV]. In particular, polytetrafluoroethylene [PTFE], tetrafluoroethylene-hexafluoropropylene copolymer [FEP], and tetrafluoroethylene-perfluoroalkoxyethylene copolymer [PFA] are desirable in view of dielectric loss tangent.

Examples of the thermosetting resin include epoxy resin, allylated epoxy resin, maleimide resin, bismaleimide resin, cyanate resin, and cyclopentadiene-styrene copolymer resin. In particular, a bismaleimide resin represented by the following general formula is used as an organic resin suitable for achieving low dielectricity.

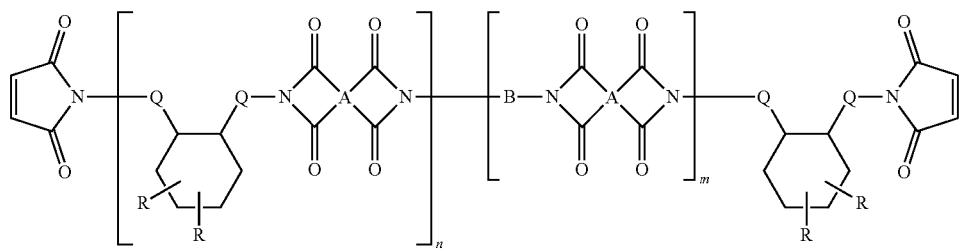

In the formula, A independently represents a tetravalent organic group including an aromatic ring or an aliphatic ring. B represents an alkylene chain having 6 to 18 carbon atoms and having an aliphatic ring that may contain a divalent heteroatom. Q independently represents a linear alkylene group having 6 or more carbon atoms. R independently represents a linear or branched alkyl group having 6 or more carbon atoms. "n" represents a number of 1 to 10. "m" represents a number of 0 to 10.

Typical bismaleimide resins include SLK-series (SLK-6895, SLK-3000, SLK-2600, etc. manufactured by Shin-Etsu Chemical Co., Ltd.). In addition, a thermosetting cyclopentadiene-styrene copolymer resin can also be used as a high heat resistance/low dielectric resin. Typical examples include the SLK-250 series (manufactured by Shin-Etsu Chemical Co., Ltd.).

[Silica Powder]

The inventive resin substrate may contain an inorganic powder as necessary, and a silica powder is preferably contained. In view of achieving low dielectricity, a silica powder having a particularly low dielectric loss tangent (low dielectric silica powder) is preferably used.

The silica powder used in the present invention is not particularly limited, but may be a silica powder having a dielectric loss tangent of 0.0001 to 0.0015 at 10 GHz. Examples include a silica powder having an average particle size of 0.1 to 30 μm, a dielectric constant of 3.2 to 3.9, and a dielectric loss tangent of 0.0001 to 0.0015 at 10 GHz. It is possible to use a low dielectric silica powder containing inside and on a part of the surface or the entire surface thereof, 200 ppm or less of a metal and/or an oxide thereof in terms of metal, the metal selected from aluminum, magnesium, and titanium, and the contained amounts of alkali metal and alkaline earth metal may be 10 ppm or less each. Furthermore, the above-described silica powder with 1 ppm or less of B, 1 ppm or less of P, and U and Th contents of 0.1 ppb or less each can also be used as a low dielectric silica powder.

Note that the average particle size can be determined as a mass-average value D50 (that is, a median diameter or a particle size when a cumulative mass is 50%) in the particle size distribution measurement by a laser diffraction method. In addition, the concentration of impurities can be measured by an atomic absorption spectrophotometry in the same manner as the quartz glass.

[Low Dielectric Silica Powder]

Low dielectric silica powder that can be used in the present invention is preferably a low dielectric silica powder which is provided with low dielectricity by heat-treating a silica powder at a temperature of 500° C. to 1,500° C., and which further has the surface of the silica powder etched with a basic aqueous solution, further preferably with alkaline electrolyzed water having a pH of 12 or higher.

A silica powder that is preferable in the present invention has a hydroxy group (Si—OH) content of 300 ppm or less, and when the content is as described, a sufficiently low dielectric loss tangent can be achieved. By the above-described heat treatment, the hydroxy group amount contained in the silica powder becomes 300 ppm or less, preferably 280 ppm or less, further preferably 150 ppm or less, and a low dielectric silica powder having characteristics of a low dielectric loss tangent is achieved.

A low dielectric silica powder used in the present invention is a silica powder that has an average particle size of 0.1 to 30 μm, preferably a maximum particle size of 100 μm or less, and when used as a filler of a substrate for high-speed communication, the average particle size can be 0.1 to 5 μm and the maximum particle size can be 20 μm, more preferably, the average particle size can be 0.1 to 3 μm and the maximum particle size can be 10 μm or less.

The low dielectric silica powder is provided with a dielectric constant of 3.2 to 3.9 and a dielectric loss tangent of 0.0001 to 0.0015, preferably 0.0001 to 0.0010, more preferably 0.0001 to 0.0008 at 10 GHz by heat-treating at a temperature of 500° C. to 1500° C.

By heat-treating a silica powder at a temperature of 500° C. or higher, the frequency dependence of the dielectric loss tangent can be freely adjusted by the adjustment of the hydroxy group amount in the silica powder particles.

Furthermore, if a strained layer is formed on the particle surface by the heat treatment and strength is degraded, a silica powder with this strained layer removed is preferably used as a low dielectric silica powder in the present invention. Regarding the removal of the strained layer of the silica powder, the strained layer can be easily removed by immersing the silica powder in an etching solution or the like in the same manner as the quartz glass cloth described above.

Furthermore, by coating the surface of the silica powder with a silane coupling agent, the adhesion between resin and the surface of the silica powder as well as the quartz glass cloth can be made strong when manufacturing prepreg.

As the silane coupling agent, a known silane coupling agent used on the quartz glass cloth described above can be used.

In particular, when a resin having a low dielectric constant and a low dielectric loss tangent is used as a matrix resin of the substrate, the difference from the quartz glass cloth in dielectric characteristics becomes great since the basket holes of the quartz glass cloth (the space between the weft and the warp of the glass cloth) are filled only with the resin. Therefore, the dielectric constant is preferably brought close to that of the quartz glass cloth by adding a silica powder. The amount of the silica powder can be 0 to 1,000 parts by mass, preferably 50 to 800 parts by mass, particularly preferably 80 to 700 parts by mass based on a sum total of 100 parts by mass of the resin component. When the amount is 50 parts by mass or more, the dielectric characteristics can be adjusted sufficiently, the coefficient of thermal expansion (CTE) of the cured material does not become too large, and sufficient strength can be achieved. Therefore, 50 parts by mass or more is preferably added. However, the resin may be used without addition of a silica powder depending on the type or usage of the organic resin. When the amount is 1,000 parts by mass or less, loss of flexibility or poor appearance do not occur when manufacturing prepreg. Note that this silica powder is preferably contained within the range of 10 to 90 mass %, in particular, 15 to 85 mass % of the total resin. The silica powder can have silica powders of different average particle sizes blended in order to enhance properties such as flowability and workability.

This low dielectric silica powder is suitable as a filler for substrates such as high-speed communication substrates and antenna substrates when used in combination with the above-described quartz glass cloth, especially low dielectric quartz glass cloth.

[Other Components]

The inventive resin substrate may contain the above-described silane coupling agent and, according to necessity, optional components such as a dye, a pigment, a flame retardant, or an adhesive aid in addition to the above-described components.

<Resin Substrate Having Dielectric Characteristics with Little Frequency Dependence>

As described above, the inventive resin substrate includes a certain organic resin and a certain quartz glass cloth. The resin substrate has a dielectric loss tangent of 0.0001 to 0.0020 at 10 GHz and a ratio of a dielectric loss tangent at 40 GHz to a dielectric loss tangent at 10 GHz (40 GHz/10 GHz ratio) is 0.8 to 1.2.

In the first place, the present invention relates to a resin substrate having dielectric characteristics with little frequency dependence including: an organic resin in which the cured resin or thermoplastic resin has a dielectric loss tangent with frequency dependence that has a negative correlation at 1 GHz to 50 GHz; and a quartz glass cloth on its own having a dielectric loss tangent with frequency dependence that has a positive correlation, or with added silica powder as necessary.

The present invention can be a resin substrate (low dielectric substrate) containing a quartz glass cloth having a dielectric loss tangent that has a positive correlation to frequency, a low dielectric resin having a dielectric loss tangent that has a negative correlation to frequency, and a silica powder having a positive correlation added as necessary. The present invention also relates to circuit board materials such as prepregs and laminated plates with which it is possible to send stable and high-quality signals having stable dielectric characteristics in a wide frequency band of 1 GHz to 50 GHz. Furthermore, the present invention relates to a printed substrate, including a multilayer printed substrate, having a low dielectric constant and a low dielectric loss tangent that are also excellent in transmission properties of high-frequency signals, a resin composition used for manufacturing such substrates, a prepreg, a laminated plate, and a resin substrate that is optimum for an antenna, an antenna dome, and the like.

—Low Dielectric Substrate with Little Frequency Dependence—

The low dielectric substrate is a laminate substrate (low dielectric laminate substrate) of an organic resin prepreg containing the above-described quartz glass cloth (preferably, low dielectric quartz glass cloth) and organic resin (preferably, organic resin having low dielectric characteristics) as essential components, and may contain a silica powder as an optional component. In the low dielectric laminate substrate, the thickness of the insulating layer can be appropriately selected according to usage, etc., and is not particularly limited, but is preferably 20 to 2,000 μm, more preferably 50 to 1,000 μm.

—Method for Manufacturing Low Dielectric Laminate Substrate—

There are no particular restrictions to methods for manufacturing the low dielectric laminate substrate, and examples include: a method of manufacturing a low dielectric laminate substrate from a prepreg obtained by impregnating a quartz glass cloth with an organic resin composition; and a method of manufacturing a low dielectric laminate substrate by thermocompression-bonding a resin film and a quartz glass cloth.

The low dielectric laminate substrate is obtained in the following manner. The organic resin (an organic resin composition containing or not containing a silica powder) having the low dielectric characteristics is dissolved/dispersed in a solvent, and a quartz glass cloth is impregnated with the organic resin in this state. Next, the solvent is removed from the impregnated quartz glass cloth by evaporation to give a prepreg. A low dielectric laminate substrate can be obtained by heat-curing the obtained prepreg by heating under pressure. Here, when a silica powder is to be contained, there is preferably 1,000 parts by mass or less (0 to 1000 parts by mass), more preferably 50 to 800 parts by mass of the silica powder per 100 parts by mass of the organic resin.

—Solvent—

When manufacturing a low dielectric laminate substrate, the solvent is not particularly limited as long as the solvent can dissolve/disperse the above-described organic resin composition, and the solvent can be made to evaporate at a temperature at which the composition can be maintained in an uncured or semi-cured state. Examples include solvents with a boiling point of 50 to 200° C., preferably 80 to 150° C. Specific examples of the solvent include: hydrocarbonic non-polar solvents such as toluene, xylene, hexane, and heptane; and hydrocarbonic polar solvents such as ethers and esters. When an organic resin that is difficult to dissolve is used, the solvent can also be used as an aqueous dispersion with a surfactant and water. The amount of solvent to be used is not particularly limited as long as the above-described organic resin composition can dissolve or disperse and the quartz glass cloth can be impregnated with the obtained solution or dispersion with the amount, and the amount is preferably 10 to 200 parts by mass, more preferably 20 to 100 parts by mass relative to 100 parts by mass of the organic resin composition.

The above-described solution or dispersion of the organic resin composition provides an organic resin prepreg. For example, the quartz glass cloth is impregnated with the solution or dispersion, and the solvent is removed in a drying furnace preferably at 50 to 150° C., more preferably at 60 to 120° C. When an aqueous dispersion is used, the prepreg is preferably further heated at 300 to 400° C. for 5 minutes to 1 hour in order to remove the surfactant.

The obtained prepreg can be superimposed so that the number of superimposed prepregs is in accordance with the thickness of the insulating layer, and this can be heated under pressure to obtain a laminate substrate. In addition, a metal foil is superimposed on the prepreg, and is heated under pressure by using a vacuum press or the like at a pressure of 5 to 50 MPa and a temperature of 70 to 400° C. to manufacture a metal-clad laminate substrate. The metal foil is not particularly limited, but a copper foil is preferably used in view of electricity and economy. Processing this metal-clad laminate substrate by normally used methods such as a subtractive method and drilling can provide a printed circuit board.

In the case of a thermoplastic resin which is difficult to dissolve in a solvent, a prepreg can also be fabricated by thermocompression-bonding a thin resin film and a quartz glass cloth. In this event, a copper foil can also be used.

For example, when fabricating a fluorine resin substrate, there is a method of compressing an already molded and surface-treated fluorine resin film, a glass cloth, and a copper foil under heating. Thermocompression-bonding under heating can normally be performed at 250 to 400° C. for 1 to 20 minutes under a pressure of 0.1 to 10 MPa. Regarding the thermocompression-bonding temperature, there are concerns for seeping of resin and loss of uniformity in thickness occurring when the temperature is high, although this depends on the softening temperature of the fluorine resin, and the temperature is preferably lower than 340° C., and more preferably 330° C. or lower. Thermocompression-bonding can also be performed in batches by using a press, and can also be performed continuously by using a high-temperature laminator. When a press is used, a vacuum press is preferably used in order to prevent sandwiching of air and to make it easier for the fluorine resin to get inside the glass cloth.

In addition, when using an aqueous dispersion of polytetrafluoroethylene (PTFE), a silica powder is mixed in the aqueous dispersion in advance in a predetermined amount to obtain a slurry, and then the quartz glass cloth is impregnated and dried. Thus, a quartz glass cloth containing fluorine resin and a silica powder can be obtained.

Pressure is applied to the obtained quartz glass cloth at the above-described temperature for the above-described time to fabricate a prepreg containing fluorine resin. In a system of an aqueous dispersion of a fluorine resin fine powder, an organic surfactant and the like are contained, and therefore, the surfactant is preferably removed by heating at 300 to 400° C. for 5 minutes to 1 hour.

By the above manufacturing method, a fluorine resin substrate which contains a fluorine resin that can be a starting material of the present invention can be fabricated.

A fluorine resin film subjected to a surface treatment cannot adhere sufficiently to a copper foil with low surface roughness on its own, and seeps out of the copper foil area during thermocompression-bonding, and thickness cannot be made uniform either. However, as described above, when compounded with a quartz glass cloth, linear expansion coefficient becomes sufficiently lowered, furthermore, seeping of the resin is also reduced, and high adhesion is exhibited even with a copper foil with a surface roughness Ra of less than 0.2 µm.

The structure of the laminate includes two sheets of copper foil and in between, "n" sheets of fluorine resin film and "n−1" sheets of quartz glass cloth laminated alternately ("n" is an integer of 2 to 10). The value of "n" is preferably 8 or less, and further preferably 6 or less. By changing the thickness of the fluorine resin film, the type of the quartz glass cloth, and the value of "n", the linear expansion coefficient of the low dielectric laminate substrate in X and Y directions can be changed. The value of the linear expansion coefficient is preferably within the range of 5 to 50 ppm/° C., further preferably 10 to 40 ppm/° C. When the linear expansion coefficient of the dielectric layer is 50 ppm/° C. or less, the adhesiveness between the copper foil and the dielectric layer does not become low, and faults such as warping and waviness of the substrate after etching the copper foil, etc. do not occur.

An electrode pattern of the metal-clad laminate substrate can be formed by a known method, for example by etching a copper-clad laminate substrate having a low dielectric laminate substrate and a copper foil provided on one or both sides of the laminate substrate.

EXAMPLE

Hereinafter, the present invention will be specifically described with reference to Examples and Comparative Examples. However, the present invention is not limited thereto.

Note that the characteristic values (tensile strength, dielectric loss tangent (tan δ), dielectric constant, and average particle size) in the following were measured by the following methods unless otherwise indicated.
1. Measurement of Tensile Strength Tensile strength was measured in accordance with "7.4 tensile strength" of "Testing methods for textile glass products" of JIS R3420: 2013.

2. Measurement of Dielectric Loss Tangent
2.1 Glass Cloth, Organic Resin, and Resin Substrate Unless otherwise stated in particular, the dielectric loss tangent of a sample at a predetermined frequency was measured by connecting a network analyzer (MS46122B manufactured by Anritsu Corporation) to an SPDR (Split post dielectric resonator) resonator (manufactured by Keysight Technologies).
2.2 Silica Powder (1) 100 parts by mass of a silica powder was mixed in 100 parts by mass of an anisole solvent containing 100 parts by mass of SLK-3000 (manufactured by Shin-Etsu Chemical Co., Ltd.), being a low dielectric maleimide resin and as a curing agent, 2.0 parts by mass of dicumyl peroxide (Percumyl D manufactured by NOF Corporation), being a radical polymerization initiator. This was dispersed and dissolved to prepare a varnish. At this time, the silica powder is 33.3% relative to the resin by volume %. In the same manner, the silica powder was blended so as to be 0%, 11.1%, and 66.7% relative to 100 parts by mass of the resin by volume %, and varnish was fabricated.

The fabricated varnish was spread to a thickness of 200 µm with a bar coater, and placed in a dryer at 80° C. for 30 minutes to remove the anisole solvent. Thus, an uncured maleimide resin composition was prepared.

(2) Each uncured maleimide resin composition prepared was placed in a mold of 60 mm×60 mm×100 µm, cured in a handpress at 180° C. for 10 minutes at 30 MPa, and then completely cured in a dryer at 180° C. in 1 hour to fabricate a cured resin sheet. The cured resin sheet was cut to a size of 50 mm×50 mm, and the dielectric loss tangent at a frequency of 10 GHz was measured using an SPDR dielectric resonator for measuring dielectric constant (manufactured by Keysight Technologies).

(3) A line of the volume % of the silica powder against the dielectric loss tangent was made from the plot obtained by plotting the values of the given dielectric loss tangent with the volume % of the silica powder on the horizontal axis and the measured dielectric loss tangent on the vertical axis. This line was extrapolated, and the dielectric loss tangent at 100% silica powder was taken as the value of the dielectric loss tangent of silica powder.

Note that there is a measuring apparatus that is said to be able to measure silica powder directly, but such an apparatus has difficulty getting rid of the air that is mixed in due to measurement performed with the silica powder loaded in a measurement pot. In particular, measurement is even more difficult with silica powder having a large specific surface area since the mixed air has a great influence. Accordingly, in order to eliminate the influence of the mixed-in air and obtain a value in a state close to the mode for actual use, the dielectric loss tangent of the silica powder was determined by the above-described measuring method in the present invention.

3. Measurement of Dielectric Constant

Regarding glass cloth, organic resin, and resin substrate, the dielectric constant of a sample at a predetermined frequency was measured by connecting the network analyzer to an SPDR resonator unless otherwise stated in particular.

Regarding silica powder, the dielectric constant was measured together with the dielectric loss tangent.

4. Measurement of Average Particle Size

The average particle size was measured with a laser diffraction type particle size distribution measurement apparatus, and the mass-average value D50 in the particle size distribution was taken as the average particle size.

<Manufacturing Low Dielectric Quartz Glass Cloth>

Preparation Example 1

Production Example of Quartz Glass Cloth (SQ1)

While extending a quartz glass thread at a high temperature, a sizing agent for quartz glass fiber was applied to fabricate a quartz glass strand from 200 quartz glass filaments with a diameter of 7.0 μm. Next, the obtained quartz glass strand was twisted by 0.2 times per 25 mm to fabricate a quartz glass yarn.

The obtained quartz glass yarn was set in an air jet loom, and a quartz glass cloth was weaved with a plain weave with a warp count (density) of 60/25 mm, and a weft count of 58/25 mm. The quartz glass cloth had a thickness of 0.086 mm and a cloth weight of 85.5 g/m².

The sizing agent for fiber was removed by heat-treating this quartz glass cloth at 400° C. for 10 hours. The quartz glass cloth with a width of 1.3 m and a length of 2,000 m manufactured in Preparation Example 1 was named SQL The dielectric loss tangent and dielectric constant of SQ1 measured at different frequencies of 10 GHz, 28 GHz, and 40 GHz were as shown in the following Table 1.

The tensile strength of the quartz glass cloth was 80 N/25 mm.

Preparation Example 2

Production Example of Quartz Glass Cloth (SQ2)

The quartz glass cloth with the width of 1.3 m and the length of 2,000 m manufactured in Preparation Example 1 was placed in an electric furnace set to 700° C. and heated for 5 hours. After heating, the quartz glass cloth was cooled to room temperature over 8 hours. The quartz glass cloth was placed in alkaline electrolyzed water with a pH of 13 heated to 40° C., and was immersed for 48 hours to perform an etching treatment. After etching, the etched quartz glass cloth was washed with ion-exchanged water and dried to fabricate a quartz glass cloth with low dielectricity and high strength. This quartz glass cloth was named SQ2. The dielectric loss tangent and dielectric constant of SQ2 measured at various frequencies in the same manner as in Preparation Example 1 were as shown in the following Table 1.

The tensile strength of the quartz glass cloth was 110 N/25 mm.

Preparation Example 3

Production Example of Quartz Glass Cloth (SQ3)

The quartz glass cloth with the width of 1.3 m and the length of 2,000 m manufactured in Preparation Example 1 was placed in an electric furnace set to 700° C. and heated for 2 hours. After heating, the quartz glass cloth was cooled to room temperature over 8 hours. The cooled quartz glass cloth was placed in alkaline electrolyzed water with a pH of 13 heated to 40° C., and was immersed for 48 hours to perform an etching treatment. After etching, the etched quartz glass cloth was washed with ion-exchanged water and dried to fabricate a quartz glass cloth with low dielectricity and high strength. This quartz glass cloth was named SQ3. The dielectric loss tangent and dielectric constant of SQ3 measured at various frequencies in the same manner as in Preparation Example 1 were as shown in the following Table 1.

The tensile strength of the quartz glass cloth was 105 N/25 mm.

TABLE 1

| | Preparation Example | | | | | |
|---|---|---|---|---|---|---|
| | 1 | | 2 | | 3 | |
| | Quartz glass cloth No. | | | | | |
| | SQ1 | | SQ2 | | SQ3 | |
| Measurement frequency | Dielectric loss tangent | Dielectric constant | Dielectric loss tangent | Dielectric constant | Dielectric loss tangent | Dielectric constant |
| 10 GHz | 0.0011 | 3.3 | 0.0002 | 3.3 | 0.0007 | 3.4 |
| 28 GHz | 0.0013 | 3.3 | 0.0002 | 3.3 | 0.0009 | 3.4 |
| 40 GHz | 0.0015 | 3.3 | 0.0003 | 3.3 | 0.0010 | 3.4 |
| 40 GHz/10 GHz *1 | 1.4 | 1.0 | 1.5 | 1.0 | 1.4 | 1.0 |

*1 The ratio of the dielectric loss tangent at 40 GHz to the dielectric loss tangent at 10 GHz (Metal Impurities Contained in Quartz Glass Cloth Manufactured in Preparation Examples 1 to 3 and Treatment with Silane Coupling Agent)

The amount of alkali metal in the quartz glass cloth was 0.5 ppm in SQ1, SQ2, and SQ3 each, P (phosphorus) content was 0.1 ppm, and U and Th contents were 0.1 ppb each. The content of each element was measured by an atomic absorption method (in terms of mass).

The quartz glass cloths SQ1, SQ2, and SQ3 were immersed in a 0.5 mass % silane coupling agent KBM-903 (product name; 3-aminopropyltrimethoxysilane manufactured by Shin-Etsu Chemical Co., Ltd.) aqueous solution for 10 minutes, and were subsequently heated and dried at 110° C. for 20 minutes for surface treatment.

<Manufacturing Low Dielectric Silica Powder>

Preparation Example 4

5 Kg of silica powder (SO-25H manufactured by ADMATECHS) with an average particle size of 0.5 μm and a dielectric loss tangent of 0.0011 at 10 GHz was placed in an alumina container and heated in a muffle furnace (manufactured by AS ONE Corporation) in the air at 1,100° C. for 5 hours, and then cooled to room temperature over 6 hours to obtain a heat-treated silica powder. The heat-treated silica powder was placed in a plastic container containing 20 liters of alkaline electrolyzed water with a pH of 13 and stirred for 2 hours while heating at 60° C. to remove a strained layer on the particle surface. Subsequently, the etched silica powder was separated with a centrifugal separator, then washed with methanol, and dried. The dried silica powder was disintegrated with a ball mill to give a low dielectric silica powder.

The dielectric loss tangent and dielectric constant of the low dielectric silica powder measured at various frequencies in the same manner as in Preparation Example 1 were as shown in the following Table 2.

The obtained low dielectric silica powder (S1) was subjected to a surface treatment with a silane coupling agent KBM-503 (3-methacryloxypropyltrimethoxysilane manufactured by Shin-Etsu Chemical Co., Ltd.), and this was used to manufacture a resin substrate.

Preparation Example 5

5 Kg of silica powder (SO-25H manufactured by ADMATECHS) with an average particle size of 0.5 μm and a dielectric loss tangent of 0.0011 at 10 GHz was placed in an alumina container and heated in a muffle furnace (manufactured by AS ONE Corporation) in the air at 700° C. for 5 hours, and then cooled to room temperature over 6 hours to obtain a silica powder. The cooled silica powder was disintegrated with a ball mill to give a low dielectric silica powder. The dielectric loss tangent and dielectric constant of the low dielectric silica powder measured at various frequencies in the same manner as in Preparation Example 1 were as shown in the following Table 2.

The obtained low dielectric silica powder (S2) was subjected to a surface treatment with a silane coupling agent KBM-503 (manufactured by Shin-Etsu Chemical Co., Ltd.), and this was used to manufacture a resin substrate.

Preparation Example 6

The dielectric loss tangent and dielectric constant of an untreated silica powder (SO-25H manufactured by ADMATECHS) having an average particle size of 0.5 μm and a dielectric loss tangent of 0.0011 at 10 GHz were measured at various frequencies in the same manner as in Preparation Example 1. The results are shown in the following Table 2.

TABLE 2

| | Preparation Example | | | | | |
|---|---|---|---|---|---|---|
| | 4 | | 5 | | 6 | |
| | Low dielectric silica No. | | | | | |
| | S1 | | S2 | | SO-25H | |
| Measurement frequency | Dielectric loss tangent | Dielectric constant | Dielectric loss tangent | Dielectric constant | Dielectric loss tangent | Dielectric constant |
| 10 GHz | 0.0002 | 3.4 | 0.0007 | 3.4 | 0.0011 | 3.4 |
| 28 GHz | 0.0003 | 3.4 | 0.0009 | 3.4 | 0.0014 | 3.4 |
| 40 GHz | 0.0004 | 3.4 | 0.0010 | 3.4 | 0.0015 | 3.4 |
| 40 GHz/10 GHz *1 | 2 | 1.0 | 1.4 | 1.0 | 1.4 | 1.0 |

*1 The ratio of the dielectric loss tangent at 40 GHz to the dielectric loss tangent at 10 GHz <Dielectric Loss Tangent and Dielectric Constant of Organic Resin>

(A) Bismaleimide Resin: SLK-3000 (Manufactured by Shin-Etsu Chemical Co., Ltd.)

A linear alkylene group-containing maleimide compound shown by the following formula:

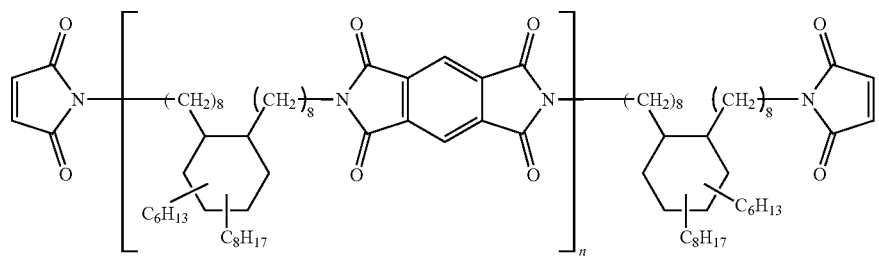

n≈3 (average value)

The dielectric loss tangent and dielectric constant of an SLK-3000 film were measured at various frequencies as in Preparation Example 1. Table 3 shows the results.

(B) Fluorine Resin (PFA)

The dielectric loss tangent and dielectric constant of a tetrafluoroethylene-perfluoroalkylvinylether copolymer (PFA) film (TFE/PPVE=98.5/1.5 (mol %), MFR (melt flow rate): 14.8 g/10 minutes, melting point: 305° C.) were measured at various frequencies as in Preparation Example 1. Table 3 shows the results.

(C) Fluorine Resin (PTFE)

The dielectric loss tangent and dielectric constant of a polytetrafluoroethylene (PTFE) film were measured at various frequencies as in Preparation Example 1. Table 3 shows the results.

(D) Maleimide Resin: MIR-3000 (Manufactured by Nippon Kayaku Co., Ltd.)

The dielectric loss tangent and dielectric constant of an MIR-3000 film were measured at various frequencies as in Preparation Example 1. Table 3 shows the results.

TABLE 3

| | Organic resin No. | | | | | | | |
|---|---|---|---|---|---|---|---|---|
| | A | | B | | C | | D | |
| | Organic resin structure/product name | | | | | | | |
| | SLK-3000 | | PFA | | PTFE | | MIR-3000 | |
| Measurement frequency | Dielectric loss tangent | Dielectric constant | Dielectric loss tangent | Dielectric constant | Dielectric loss tangent | Dielectric constant | Dielectric loss tangent | Dielectric constant |
| 10 GHz | 0.0016 | 2.5 | 0.0010 | 2.1 | 0.0002 | 2.1 | 0.0031 | 2.8 |
| 28 GHz | 0.0015 | 2.5 | 0.0009 | 2.1 | 0.0002 | 2.1 | 0.0035 | 2.8 |
| 40 GHz | 0.0014 | 2.5 | 0.0008 | 2.1 | 0.0001 | 2.1 | 0.0037 | 2.8 |
| 40 GHz/10 GHz *1 | 0.9 | 1.0 | 0.8 | 1.0 | 0.5 | 1.0 | 1.2 | 1.0 |

*1 The ratio of the dielectric loss tangent at 40 GHz to the dielectric loss tangent at 10 GHz <Preparation of Slurry>

Preparation Example 7

100 parts by mass of SLK-3000, 100 parts by mass of the silica powder SO-25H shown in Preparation Example 6, and 2 parts by mass of dicumyl peroxide (product name: Percumyl D, manufactured by NOF Corporation) were added into anisole as a solvent. This was premixed with a stirrer to fabricate a 60% slurry solution, and a bismaleimide resin composition slurry having a uniformly dispersed filler was prepared.

Preparation Example 8

100 parts by mass of MIR-3000 (low dielectric maleimide resin manufactured by Nippon Kayaku Co., Ltd.), 100 parts by mass of the silica powder (S2) shown in Preparation Example 5, and 2 parts by mass of dicumyl peroxide (product name: Percumyl D, manufactured by NOF Corporation) were added into anisole as a solvent. This was premixed with a stirrer to fabricate a 60% slurry solution, and a maleimide resin composition slurry having an evenly dispersed filler was prepared.

Preparation Example 9

100 parts by mass of MIR-3000 (low dielectric maleimide resin manufactured by Nippon Kayaku Co., Ltd.), 100 parts by mass of the silica powder (S1) shown in Preparation Example 4, and 2 parts by mass of dicumyl peroxide (product name: Percumyl D, manufactured by NOF Corporation) were added into anisole as a solvent. This solution was premixed with a stirrer to fabricate a 60% slurry solution, and a maleimide resin composition slurry having an evenly dispersed filler was prepared.

Example 1

Fluorine Resin Prepreg and Laminate Substrate

Two tetrafluoroethylene-perfluoroalkylvinylether copolymer (PFA) films (TFE/PPVE=98.5/1.5 (mol %), MFR: 14.8 g/10 minutes, melting point: 305° C.) having a thickness of 50 μm and having a dielectric constant of 2.1 and a dielectric loss tangent of 0.0010 at 10 GHz, and one sheet of the quartz glass cloth (SQ3) shown in Preparation Example 3 were provided. They were laminated in the order PFA film/quartz glass cloth/PFA film. This was hot-pressed at 325° C. for 30 minutes by using a vacuum pressure press to fabricate a fluorine resin substrate.

The fluorine resin substrate had no molding defects, and a favorable fluorine resin substrate was obtained. The dielectric loss tangent and dielectric constant of the resin substrate were measured.

The dielectric loss tangent and dielectric constant of the fabricated fluorine resin substrate are shown in Table 4.

Example 2

Bismaleimide Resin Prepreg and Laminate Substrate

The quartz glass cloth SQ1 was impregnated with the slurry of Preparation Example 7. Then, the resultant was dried at 120° C. for 5 minutes to fabricate a prepreg. In this event, the adhered amount was adjusted to be 46%. Subsequently, three sheets of the fabricated prepreg were laminated, and using a vacuum decompression press, this laminate was cured in steps: at 150° C. for 1 hour; and furthermore, at 180° C. for 2 hours. Thus, a resin substrate was fabricated. The dielectric loss tangent and dielectric constant of the cured resin substrate were measured. Table 4 shows the results.

Example 3

Silica Powder-Containing Fluorine Resin Substrate

To 100 parts by mass of a polytetrafluoroethylene fine particle aqueous dispersion (PTFE aqueous dispersion) containing 60 mass % of polytetrafluoroethylene (PTFE) fine particles, 6 mass % of a nonionic surfactant, and 34 mass % of water, 40 parts by mass of the low dielectric silica powder (S1) shown in Preparation Example 4 was added and mixed to prepare a silica powder-containing PTFE dispersion. The quartz glass cloth (SQ2) shown in Preparation Example 2 was impregnated and coated with this dispersion, adjusting the adhered amount of PTFE to 46 mass %. Subsequently, the water content was eliminated by drying in a drying furnace at 100° C. for 10 minutes. Next, the fabricated prepreg was molded with a vacuum decompression press at 380° C. and at 1.5 MPa for 5 minutes. The molded prepreg was further left to stand in a dryer at 380° C. for 5 minutes to fabricate a fluorine resin substrate.

The dielectric loss tangent and dielectric constant of the fabricated silica powder-containing fluorine resin substrate were measured. Table 4 shows the results.

The fluorine resin substrate had no molding defects, and a strong fluorine resin substrate having a small coefficient of thermal expansion was obtained.

Comparative Example 1

The quartz glass cloth SQ1 was impregnated with the slurry of Preparation Example 8. Then, the resultant was dried at 120° C. for 5 minutes to fabricate a prepreg. In this event, the adhered amount was adjusted to be 46%. Subsequently, three sheets of the fabricated prepreg were laminated, and using a vacuum decompression press, this laminate was cured in steps: at 150° C. for 1 hour; and furthermore, at 180° C. for 2 hours. Thus, a resin substrate was fabricated. The dielectric loss tangent and dielectric constant of the cured resin substrate were measured. Table 4 shows the results.

Comparative Example 2

The quartz glass cloth SQ2 was impregnated with the slurry of Preparation Example 9. Then, the resultant was dried at 120° C. for 5 minutes to fabricate a prepreg. In this event, the adhered amount was adjusted to be 46%. Subsequently, three sheets of the fabricated prepreg were laminated, and using a vacuum decompression press, this laminate was cured in steps: at 150° C. for 1 hour; and furthermore, at 180° C. for 2 hours. Thus, a resin substrate was fabricated. The dielectric loss tangent and dielectric constant of the cured resin substrate were measured. Table 4 shows the results.

It can be observed from Table 4 that the resin substrates of Examples 1 to 3, which satisfied the features of the present invention, had a low dielectric loss tangent and a 40 GHz/10 GHz ratio of 1.0 to 1.1 as well. Thus, the resin substrates had stable dielectric characteristics in a wide frequency band of 1 GHz to 50 GHz, that is, the resin substrates exhibited dielectric characteristics with little frequency dependence.

On the other hand, in Comparative Examples 1 and 2, in which the organic resin to be a matrix of the resin substrate had a 40 GHz/10 GHz ratio outside the range of the present invention, the 40 GHz/10 GHz ratios of the resin substrates were 1.3, and the dielectric loss tangent had great frequency dependence. As apparent from the above-described Edward A. Wolff formula, the transmission loss of the signals will become greater as frequency becomes higher.

As clearly shown in the above results, when the inventive resin substrate is used, it is possible to achieve dielectric characteristics with little frequency dependence and send stable signals with excellent quality without variation in propagation time. This can be achieved by appropriately combining: an organic resin having a dielectric loss tangent that has frequency dependence with a negative correlation, that is, the higher the frequency, the smaller the dielectric loss tangent; and a raw material having, on the other hand, a dielectric loss tangent that has a positive correlation to frequency, that is, the higher the frequency, the greater the dielectric loss tangent.

In particular, in the present invention, the frequency dependence of the dielectric loss tangent of the quartz glass cloth and silica powder constituting the resin substrate can be freely altered. Therefore, by adjusting the frequency

TABLE 4

|  | Example | | | Comparative Example | |
|---|---|---|---|---|---|
|  | | Example & Comparative Example | | | |
|  | 1 | 2 | 3 | 1 | 2 |
|  | | Preparation Example | | | |
|  | — | 7 | — | 8 | 9 |
|  | | Quartz glass cloth No. | | | |
|  | SQ3 | SQ1 | SQ2 | SQ1 | SQ2 |
|  | | Organic resin | | | |
|  | PFA | SLK-3000 | PTFE | MIR-3000 | MIR-3000 |
|  | | Silica powder No. | | | |
|  | — | SO-25H | S1 | S2 | S1 |

| Measurement frequency | Dielectric loss tangent | Dielectric constant | Dielectric loss tangent | Dielectric constant | Dielectric loss tangent | Dielectric constant | Dielectric loss tangent | Dielectric constant | Dielectric loss tangent | Dielectric constant |
|---|---|---|---|---|---|---|---|---|---|---|
| 10 GHz | 0.0008 | 3.2 | 0.0014 | 3.2 | 0.0002 | 3.2 | 0.0021 | 3.3 | 0.0020 | 3.4 |
| 28 GHz | 0.0009 | 3.2 | 0.0014 | 3.2 | 0.0003 | 3.2 | 0.0025 | 3.3 | 0.0022 | 3.4 |
| 40 GHz | 0.0009 | 3.2 | 0.0014 | 3.2 | 0.0002 | 3.2 | 0.0027 | 3.3 | 0.0025 | 3.4 |
| 40 GHz/10 GHz *1 | 1.1 | 1.0 | 1.0 | 1.0 | 1.0 | 1.0 | 1.3 | 1.0 | 1.3 | 1.0 |

*1 The ratio of the dielectric loss tangent at 40 GHz to the dielectric loss tangent at 10 GHz dependence according to the frequency dependence of the dielectric loss tangent of the low dielectric resin contained in the resin substrate, it is possible to manufacture a resin substrate having very little variation of dielectric characteristics depending on frequency easily and efficiently. For this reason, the present invention has an extremely high utility value in fields of low dielectric substrate for high-speed millimeter-wave communication or the like where stable dielectric characteristics are required in a wide frequency band of 1 GHz to 50 GHz.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A resin substrate comprising an organic resin and a quartz glass cloth, wherein
the organic resin is a thermoplastic resin and has a dielectric loss tangent of 0.0002 to 0.0020 measured at 10 GHz and a ratio of a dielectric loss tangent at 40 GHz to a dielectric loss tangent at 10 GHz (40 GHz/10 GHz ratio) is 0.4 to 0.9,
the quartz glass cloth has a dielectric loss tangent of 0.0001 to 0.0015 measured at 10 GHz and a ratio of a dielectric loss tangent at 40 GHz to a dielectric loss tangent at 10 GHz (40 GHz/10 GHz ratio) is 1.2 to 2.0, and
the resin substrate has a dielectric loss tangent of 0.0001 to 0.0020 at 10 GHz and a ratio of a dielectric loss tangent at 40 GHz to a dielectric loss tangent at 10 GHz (40 GHz/10 GHz ratio) is 0.8 to 1.2.

2. The resin substrate according to claim 1, wherein the organic resin is one or more thermoplastic resins selected from a group consisting of polyphenylene ether, polyether ether ketone, polyether ketone, polyether sulfone, and fluorine resin.

3. The resin substrate according to claim 2, wherein the thermoplastic resin is fluorine resin.

4. The resin substrate according to claim 3, wherein the fluorine resin is one or more selected from a group consisting of polytetrafluoroethylene [PTFE], tetrafluoroethylene-hexafluoropropylene copolymer [FEP], and tetrafluoroethylene-perfluoroalkoxyethylene copolymer [PFA].

5. A resin substrate comprising an organic resin, a quartz glass cloth, and a silica powder having a dielectric loss tangent of 0.0001 to 0.0015 at 10 GHz, wherein
the organic resin has a dielectric loss tangent of 0.0002 to 0.0020 measured at 10 GHz and a ratio of a dielectric loss tangent at 40 GHz to a dielectric loss tangent at 10 GHz (40 GHz/10 GHz ratio) is 0.4 to 0.9,
the quartz glass cloth has a dielectric loss tangent of 0.0001 to 0.0015 measured at 10 GHz and a ratio of a dielectric loss tangent at 40 GHz to a dielectric loss tangent at 10 GHz (40 GHz/10 GHz ratio) is 1.2 to 2.0, and
the resin substrate has a dielectric loss tangent of 0.0001 to 0.0020 at 10 GHz and a ratio of a dielectric loss tangent at 40 GHz to a dielectric loss tangent at 10 GHz (40 GHz/10 GHz ratio) is 0.8 to 1.2.

6. The resin substrate according to claim 5, wherein the organic resin is one or more thermosetting resins selected from a group consisting of epoxy resin, allylated epoxy resin, maleimide resin, bismaleimide resin, cyanate resin, and cyclopentadiene-styrene copolymer resin.

7. The resin substrate according to claim 5, wherein the organic resin is a thermosetting resin and the thermosetting resin is a bismaleimide resin shown by the following general formula,

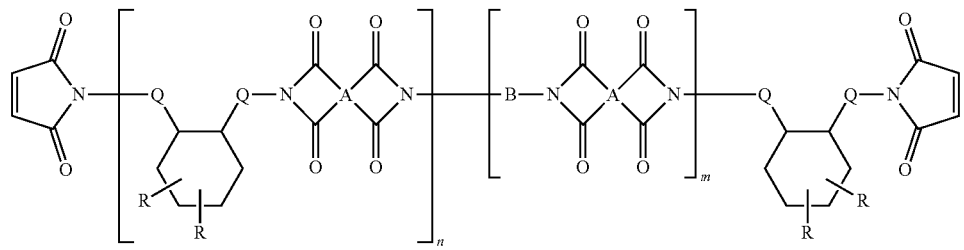

wherein A independently represents a tetravalent organic group including an aromatic ring or an aliphatic ring; B represents an alkylene chain having 6 to 18 carbon atoms and having an aliphatic ring optionally containing a divalent heteroatom; Q independently represents a linear alkylene group having 6 or more carbon atoms; R independently represents a linear or branched alkyl group having 6 or more carbon atoms; "n" represents a number of 1 to 10; and "m" represents a number of 0 to 10.

8. The resin substrate according to claim 5, wherein the organic resin is one or more thermoplastic resins selected from a group consisting of polyphenylene ether, polyether ether ketone, polyether ketone, polyether sulfone, and fluorine resin.

9. The resin substrate according to claim 8, wherein the thermoplastic resin is fluorine resin.

10. The resin substrate according to claim 9, wherein the fluorine resin is one or more selected from a group consisting of polytetrafluoroethylene [PTFE], tetrafluoroethylene-hexafluoropropylene copolymer [FEP], and tetrafluoroethylene-perfluoroalkoxyethylene copolymer [PFA].

11. A resin substrate comprising an organic resin and a quartz glass cloth, wherein
the organic resin has a dielectric loss tangent of 0.0002 to 0.0020 measured at 10 GHz and a ratio of a dielectric loss tangent at 40 GHz to a dielectric loss tangent at 10 GHz (40 GHz/10 GHz ratio) is 0.4 to 0.9,
the quartz glass cloth has a dielectric loss tangent of 0.0001 to 0.0015 measured at 10 GHz and a ratio of a dielectric loss tangent at 40 GHz to a dielectric loss tangent at 10 GHz (40 GHz/10 GHz ratio) is 1.2 to 2.0,
the resin substrate has a dielectric loss tangent of 0.0001 to 0.0020 at 10 GHz and a ratio of a dielectric loss tangent at 40 GHz to a dielectric loss tangent at 10 GHz (40 GHz/10 GHz ratio) is 0.8 to 1.2, and
the organic resin is a thermosetting resin and the thermosetting resin is a bismaleimide resin shown by the following general formula,

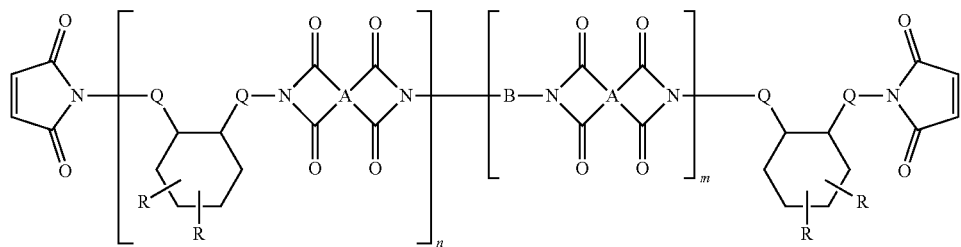

wherein A independently represents a tetravalent organic group including an aromatic ring or an aliphatic ring; B represents an alkylene chain having 6 to 18 carbon atoms and having an aliphatic ring optionally containing a divalent heteroatom; Q independently represents a linear alkylene group having 6 or more carbon atoms; R independently represents a linear or branched alkyl group having 6 or more carbon atoms; "n" represents a number of 1 to 10; and "m" represents a number of 0 to 10.

* * * * *